United States Patent [19]

Morita

[11] Patent Number: 4,556,025
[45] Date of Patent: Dec. 3, 1985

[54] ENGINE VALVE MECHANISM HAVING VALVE DISABLING DEVICE

[75] Inventor: Yasuyuki Morita, Hiroshima, Japan

[73] Assignee: Mazda Motor Corporation, Hiroshima, Japan

[21] Appl. No.: 671,946

[22] Filed: Nov. 16, 1984

[30] Foreign Application Priority Data

Nov. 18, 1983 [JP] Japan .................................. 58-218378
Nov. 26, 1983 [JP] Japan .................................. 58-222600
Dec. 2, 1983 [JP] Japan .................................. 58-229008

[51] Int. Cl.$^4$ ............................................ F02D 13/06
[52] U.S. Cl. .............................. 123/198 F; 123/90.16; 123/90.27; 123/90.39
[58] Field of Search ............... 123/198 F, 90.39, 90.15, 123/90.16, 90.27, 90.32

[56] References Cited

U.S. PATENT DOCUMENTS

| | | | |
|---|---|---|---|
| 3,641,988 | 2/1972 | Torazza et al. | 123/90.39 |
| 4,204,512 | 5/1980 | Brock | 123/90.39 |
| 4,252,093 | 2/1981 | Hazelrigg | 123/198 F |
| 4,380,219 | 4/1983 | Walsh | 123/198 F |
| 4,387,680 | 6/1983 | Tsunetomi et al. | 123/198 F |
| 4,429,853 | 2/1984 | Chaffiote et al. | 123/198 F |
| 4,462,353 | 7/1984 | Arai et al. | 123/198 F |
| 4,463,717 | 8/1984 | Veno | 123/198 F |
| 4,475,497 | 10/1984 | Honda et al. | 123/198 F |

FOREIGN PATENT DOCUMENTS

| | | | |
|---|---|---|---|
| 3148720 | 7/1983 | Fed. Rep. of Germany | 123/198 F |
| 57-193903 | 12/1982 | Japan . | |
| 1275308 | 5/1972 | United Kingdom . | |

Primary Examiner—Ira S. Lazarus
Attorney, Agent, or Firm—Fleit, Jacobson, Cohn & Price

[57] ABSTRACT

An engine valve mechanism including a rocker arm mechanism having a cam actuated arm which is swingable actuated by a cam and a valve actuating arm which functions to open to the engine valve when it is swingably moved. A plunger is provided on one of the arms for an axial movement and extends toward the other arm. A locking plate is movable between a locking position and retracted position. In the locking position, the locking plate locks the plunger against the axial movement so that the swinging movement of the cam actuated arm is transmitted through the plunger to the valve actuating arm to thereby make it possible to actuate the valve in response to a rotation of the cam. In the retracted position, the locking plate releases the plunger so that the swinging movement of the cam actuated arm is not transmitted to the valve actuating arm.

8 Claims, 5 Drawing Figures

ENGINE VALVE MECHANISM HAVING VALVE DISABLING DEVICE

BACKGROUND OF THE INVENTION

1. Field of the Invention

The present invention relates to an engine valve mechanism and more particularly to a valve actuating mechanism for an internal combustion engine. More specifically, the present invention pertains to an engine valve actuating mechanism which can hold engine valves in closed positions so as to make an engine cylinder inoperative when desired.

2. Description of Prior Art

Efforts have hithertofore been made to develop valve actuating mechanisms by which engine intake and exhaust valves can be held in closed positions so that one or more cylinders of the engine are made inoperative under certain engine operating conditions, for example, under a light load engine operation. For the purpose, the British Pat. No. 1,275,328 proposes a valve actuating mechansim including a rocker arm device which is comprised of a cam actuated arm and a valve actuating arm, both of the arms being mounted on a shaft for swingable movement with respect to each other about the axis of the shaft. The cam actuated arm is engaged with a valve actuating cam so that the arm is swingably actuated by the cam. The cam actuated arm carries a hydraulically actuated plunger having one end engaged with the valve actuating arm which is adapted to operate an engine valve. An application of a hydraulic pressure to the plunger causes the plunger to restrict the relative swingable movement between the arms so that a movement applied by the cam to the cam actuated arm is transmitted through the plunger to the valve actuating arm to thereby actuate the engine valve. When the hydraulic pressure is released, the movement of the cam actuated arm is no longer transmitted to the valve actuating arm so that the engine valve is maintained in the closed position.

The proposed mechanism is however considered disadvantageous in that the cam actuated arm must be formed with a hydraulic cylinder for slidably and liquid-tightly receiving the plunger. Further, hydraulic liquid passages must be formed in the cam actuated arm and the shaft carrying the arm. Thus, the proposed mechanism is complicated in structure and expensive to manufacture. It should further be pointed out that the mechanism shows a poor responsive characteristics in switching between the motion transmitting condition and the free condition since the switching is performed hydraulically.

Japanese laid open utility model 57-193903 proposes an engine valve actuating mechanism in which the rocker arm device is comprised of a cam actuated arm and a valve actuating arm which are swingably mounted on a shaft. The cam actuated arm is further slidable along the shaft so that it can be moved between an engaged position wherein it is engaged with the valve actuating arm and an axially shifted, disengaged position wherein it is disengaged from the valve actuating arm. The proposed mechanism is however disadvantageous in that a complicated mechanism is required for moving the cam actuated arm between the engaged and disengaged positions. Further, the cam actuated arm must be of a substantial axial length so that it can be maintained in engagement with the valve actuating cam both in the engaged and disengaged positions.

OBJECT OF THE INVENTION

It is an object of the present invention to provide an engine valve actuating mechanism of a type in which an engine valve can be held in an inactive, closed position as desired, and which is simple in structure and reliable in operation.

Another object of the present invention is to provide an engine valve actuating mechanism which is capable of being switched from a normal operating condition to an inactive position and vice versa with a satisfactory response.

A further object of the present invention is to provide an engine valve actuating mechanism provided with a less expensive, reliable valve disabling device.

SUMMARY OF THE INVENTION

According to the present invention, in order to accomplish the above and other objects, there is provided an engine valve mechanism including valve means which is resiliently urged into a closed position, valve actuating means for actuating said valve means into an open position, said valve actuating means including cam means adapted to be rotated in synchronism with an engine rotation, first swingable arm means swingable about an axis and adapted to be engaged with said cam means to be swingably actuated thereby, second swingable arm means swingable about said axis and adapted to be engaged with said valve means to open the valve means when the second swingable arm means is swung about said axis, plunger means provided on one of said first and second swingable arm means and axially slidably movable on said one arm means, resilient means for urging said plunger means axially to have one end of said plunger means engage with the other swingable arm means, mechanical constraining means movable between a constraining position wherein it constrains the plunger means at a projected position against axial movement so that a swingable movement of the first swingable arm means is transmitted through the plunger means to the second swingable arm means to have the valve means actuated by the cam means and a retracted position wherein the plunger means is made free to move axially against the resilient means so that the second swingable arm means is maintained stationary even when the first swingable arm means is actuated by the cam means to hold the valve means in the closed position. Preferably, the plunger means is provided on the second swingable arm means so as to make the first swingable arm means small in weight.

The mechanical constraining means may include a locking plate for locking the plunger means in the projected position. The locking plate may be movable in a direction transverse to the axis of the plunger means between a locking position and a release position and may have a slot engageable with a groove formed in the plunger means. In the locking position, the slot in the locking plate engages the groove in the plunger means so that the plunger means is held against axial movement. In the release position, the slot in the locking plate is disengaged from the groove in the plunger means so that the plunger means can be moved axially against the influence of the resilient means. The resilient means tends to force the plunger axially outward so that the locking plate can be moved from the release position into engagement with the plunger means when the plunger means is in the projected position. The locking plate may be actuated into and out of the locking position of solenoid means.

BRIEF DESCRIPTIONS OF THE DRAWINGS

DESCRIPTIONS OF THE PREFERRED EMBODIMENTS

Figure 1:
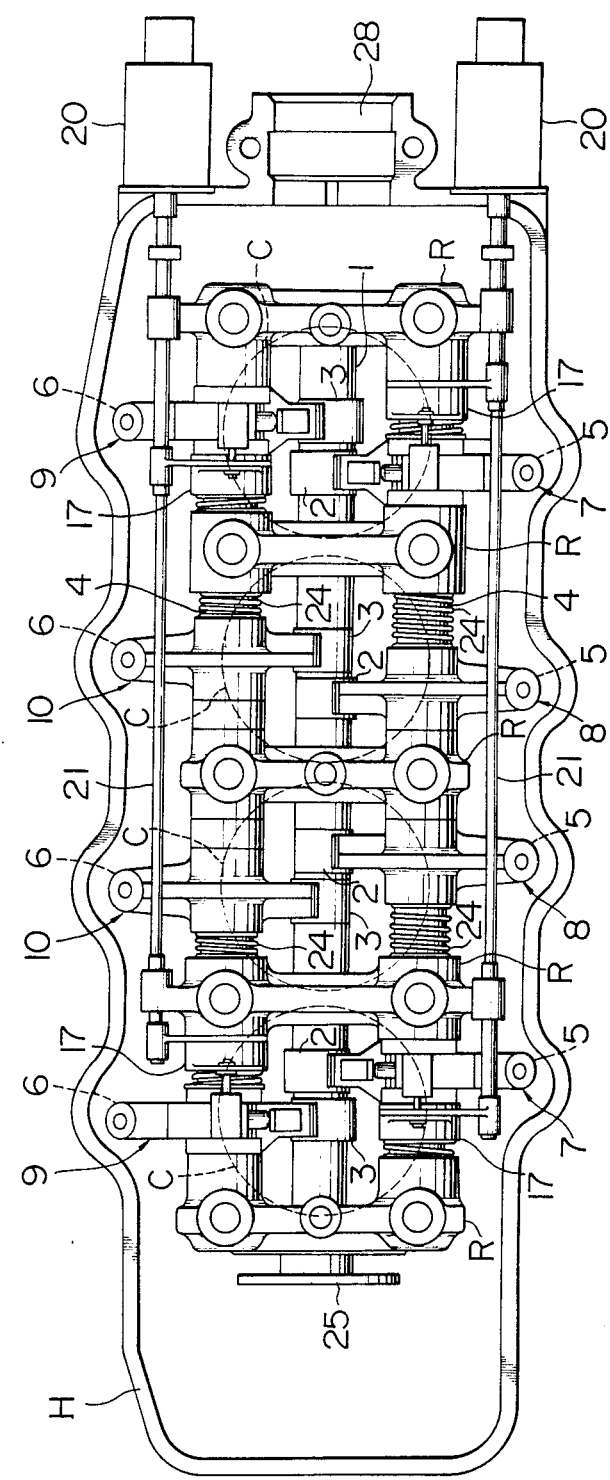
FIG. 1 is a plan view of a valve actuating mechanism of a four cylinder engine embodying the features of the present invention.
Figure 2:
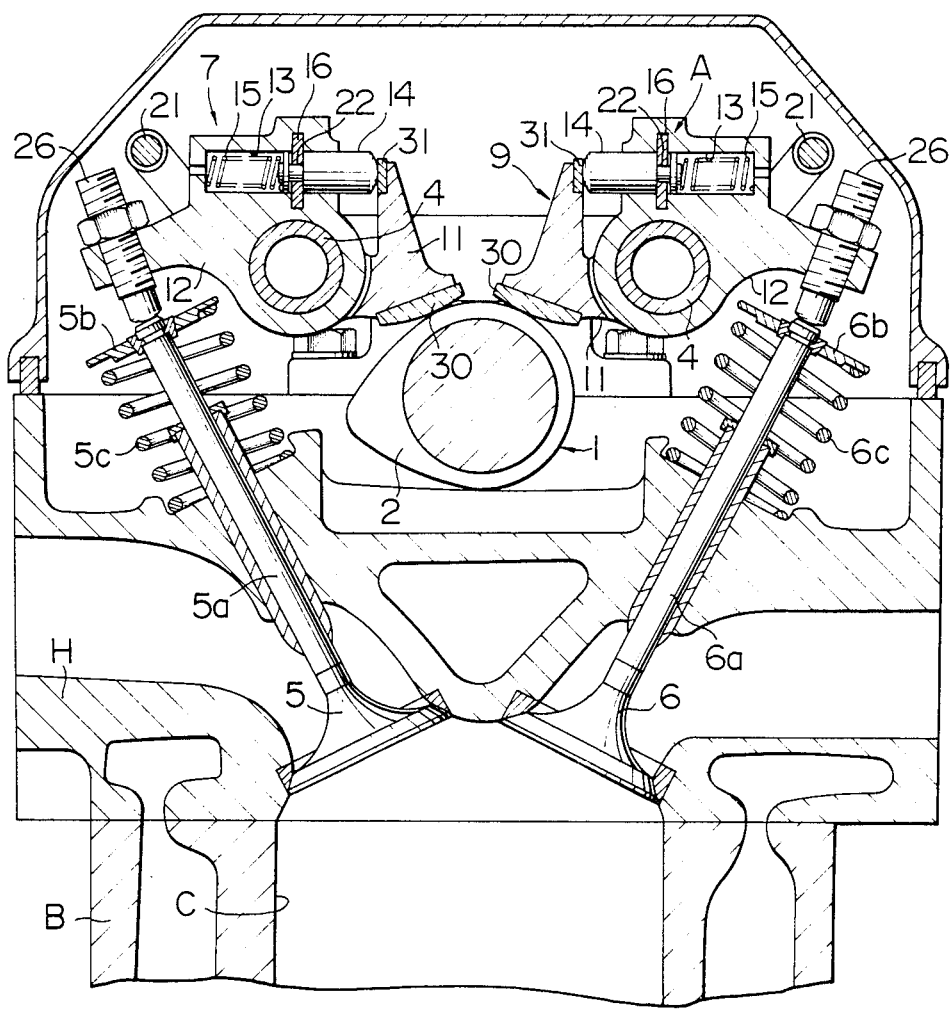
FIG. 2 is a vertical sectional view of the valve actuating mechanism shown in FIG. 1.

Referring now to the drawings, particularly to FIGS. 1 and 2, there is shown a four cylinder engine having cylinder bores C formed in a cylinder block B. On the cylinder block B, there is mounted a cylinder head H which is formed with rocker brackets R rotatably carrying a cam shaft 1. The cam shaft 1 extends along the row of the cylinder bore C and is formed at portions corresponding to the cylinder bore C with cams 2 and 3. The rocker brackets R further carry a pair of rocker shafts 4 located one at each side of the cam shaft 1.

As shown in FIG. 2, the cylinder head H is formed with an intake and exhaust ports which are provided for each cylinder bore C and respectively associated with an intake and exhaust valves 5 and 6. The intake and exhaust valves 5 and 6 respectively have valve stems 5a and 6a provided at outer ends with tappets 5b and 6b, respectively. Between the cylinder head and the tappets 5b and 6b, there are valve springs 5c and 6c, respectively, which force the valves 5 and 6 into closed positions. The rocker shafts 4 carry valve actuating rocker arm mechanisms 7 and 9 for the intake and exhaust valves 5 and 6 of the cylinder bores C at the opposite ends of the cylinder row, and valve actuating rocker arm mechanisms 8 and 10 for the intake and exhaust valves 5 and 6 of the intermediate cylinder bores C. The rocker arm mechansims 8 and 10 for the intermediate cylinder bores C are of conventional type which are swingably moved respectively by the cams 2 and 3 to cyclically open the valves 5 and 6.

In FIG. 2, there are shown valve actuating rocker arm mechanisms 7 and 9 for the valves 5 and 6 of the cylinder bores C at the opposite ends of the cylinder row. The mechanisms 7 and 9 are substantially identical in structure so that corresponding parts are shown by the same reference numerals and description will be made only with respect to the rocker arm mechanism 7.

Figure 3:
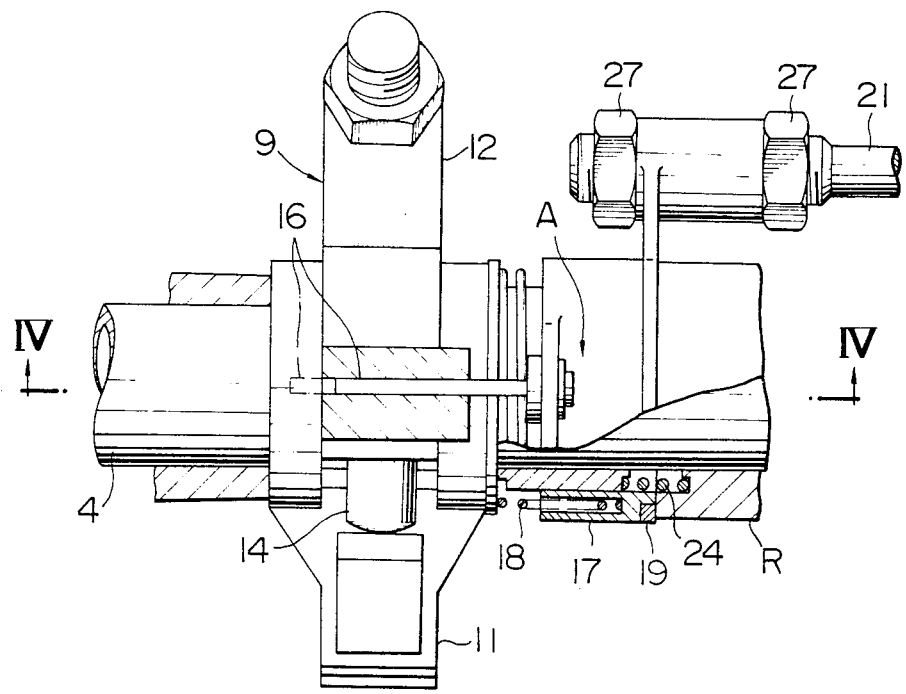
FIG. 3 is a partially sectioned enlarged view showing details of the valve actuating mechanism.
Figure 4:
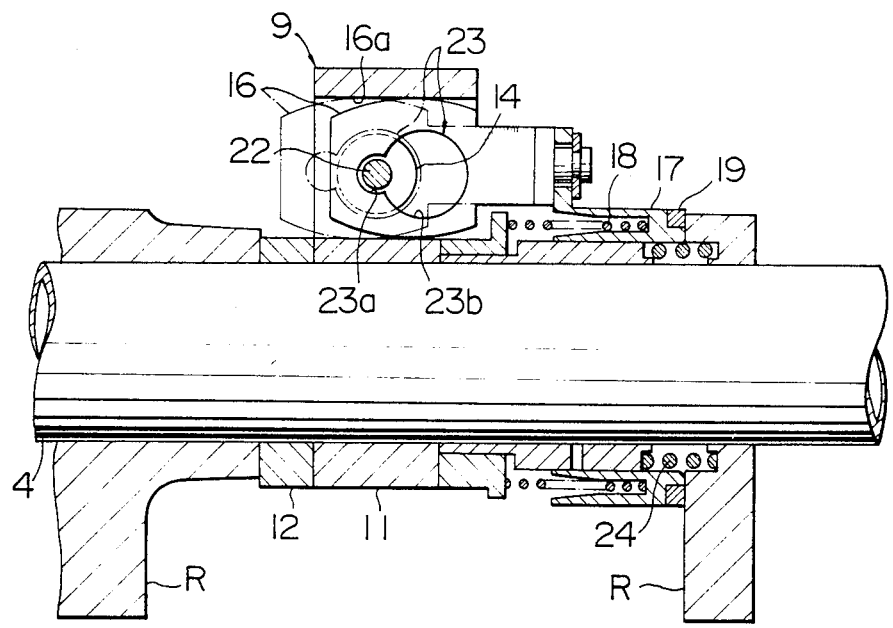
FIG. 4 is an enlarged sectional view of the plunger locking mechanism.

The rocker arm mechanism 7 includes a cam actuated arm 11 and a valve actuating arm 12 both mounted on the rocker shaft 4 for swingable movement about the longitudinal axis of the shaft 4 as shown in FIGS. 3 and 4. At one end of the cam actuated arm 11, there is provided a shoe 30 of a wear resistant material which is adapted to be engaged with the cam 2. The valve actuating arm 12 carries at one end an adjusting screw 26 which is adapted to be engaged with the valve stem 5a. The arm 12 is formed with a cylindrical bore 13 extending toward the arm 11 and a plunger 14 is axially slidably received in the bore 13. A spring 15 provided in the bore 13 functions to force the plunger 14 outwardly toward the arm 11 so that the outer end of the plunger 14 is maintained in contact with the arm 11. The arm 11 is therefore provided with a shoe 31 for engagement with the outer end of the plunger 14.

Transversely across the cylindrical bore 13, there is formed a guide slit 16a in the valve actuating arm 12 and a locking plate 16 is slidably received in the guide slit 16a. The locking plate 16 is movable transverse to the axis of the cylindrical bore 13 and formed with a double hole 23 constituted by a small diameter part 23a and a large diameter part 23b. The plunger 14 is formed with a circumferential groove 22 which is adapted to be engaged with the small diameter part 23a of the hole 23 in the locking plate 16. The large diameter part 23b has a diameter larger than that of the plunger 14. It will therefore be understood that, when the small diameter part 23a is engaged with the circumferential groove 22 in the plunger 14, the plunger 14 is locked by the locking plate 16 in the position shown in FIG. 2. The locking plate 16 is however movable transverse to the cylindrical bore 13 to a position shown by dotted lines in FIG. 4 wherein the large diameter part 23b is aligned with the plunger 14. In this position, the plunger 14 is free to move against the influence of the spring 15. Since the valve spring 5c is stronger than the spring 15, a swinging movement of the cam actuated arm 11 simply causes an axial movement of the plunger 15 so that the valve actuating arm 12 is maintained stationary when the locking plate 16 is in the position shown by dotted lines in FIG. 4.

Referring further to FIGS. 3 and 4, it will be noted that the rocker shaft 4 carries a sleeve 17 which is axially slidable along the shaft 4. The sleeve 17 is connected with the locking plate 16 to move therewith. A spring 18 is provided to force the sleeve 17 in a direction in which the locking plate 16 is biased to the position wherein the small diameter part 23a is engaged with groove 22 in the plunger 14. A drive ring 19 is engaged with an end of the sleeve 17 and connected with a push rod 21 through adjusting nuts 27. As shown in FIG. 1, the push rod 21 is connected with a solenoid 20 so that when the solenoid 20 is energized the push rod 21 is forced leftward as seen in the planes of FIGS. 1 and 3 so as to place the locking plate 16 in the position shown by dotted lines in FIG. 4 to thereby release the plunger 14. When the solenoid 20 is de-energized, the sleeve 17 and the locking plate 16 are shifted rightward under the influence of the spring 18 to place the locking plate 16 in the position shown by solid lines in FIG. 4.

It will therefore be understood that, when the solenoid 20 is de-energized, the plunger 14 is locked in the position shown in FIG. 4 by having the groove 22 engaged with the locking plate 16. Thus, the swinging movement of the cam actuated arm 11 is transmitted through the plunger 14 to the valve actuating arm 12 so that the valve 5 is opened cylically in repsonse to rotations of the cam 2. In this instance, the locking plate 16 and the sleeve 17 are moved in response to swinging movements of the arm 12. Since the sleeve 17 is mounted on the rocker shaft 4, the movements are performed smoothly and a reliable operation is ensured. When the solenoid 20 is energized, however, the plunger 14 is released so that the swinging movement of the cam actuated arm 11 is absorbed by the axial movement of the plunger 14. Therefore, the valve actuating arm 12 is maintained stationary holding the valve 5 in the closed position. The operation of the exhaust valve 6 can be controlled in the same manner.

The illustrated embodiment is considered advantageous in that the plunger and its locking mechanism are carried by the valve actuating arm 12 so that the cam actuated arm 11 can be of a small weight. Thus, it is possible to decrease the inertia of the cam actuated arm 11. This is advantageous in that even under a high speed engine operation wherein a surging is likely to occur due to a strong suction pressure, there will be a less possibility of the valves being opened under the combined actions of the suction pressure in the combustion chamber and the inertia force of the cam actuated arms.

Figure 5:
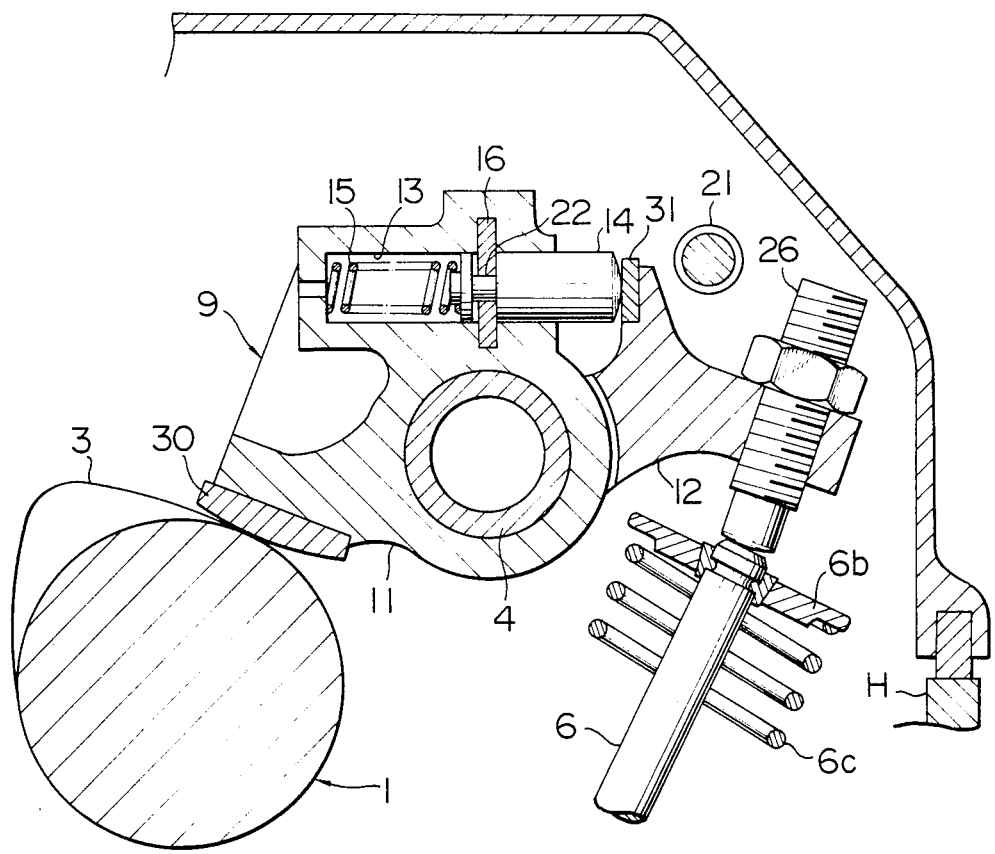
FIG. 5 is a fragmentary sectional view showing the valve actuating mechanism in accordance with another embodiment of the present invention.

FIG. 5 shows another embodiment of the present invention in which corresponding parts are designated by the same reference numerals as in the previous embodiment. In this embodiment, the cam actuated arm 11 is formed with a cylindrical bore 13 in which a plunger 14 is axially slidably received. A spring 15 forces the plunger 14 axially outward toward the valve actuating arm 12. The arm 12 has a shoe 31 for engagement with the outer end of the plunger 14. The cam actuated arm 11 is further provided with a locking plate 16 for releasably locking the plunger 14 in the projected position. In other respects, the arrangements are the same as in the previous embodiment.

The invention has thus been shown and described with reference to specific embodiments, however, it should be noted that the invention is in no way limited to the details of the illustrated structures but changes and modifications may be made without departing from the scope of the appended claims.

I claim:

1. An engine valve mechanism including valve means which is resiliently urged into a closed position, valve actuating means for actuating said valve means into an open position, said valve actuating means including cam means adapted to be rotated in synchronism with an engine rotation, first swingable arm means swingable about an axis and adapted to be engaged with said cam means to be swingably actuated thereby, second swingable arm means swingable about said axis and adapted to be engaged with said valve means to open the valve means when the second swingable arm means is swung about said axis, plunger means provided on one of said first and second swingable arm means and axially slidably movable on said one arm means, resilient means for urging said plunger means axially to have one end of said plunger means engage with the other swingable arm means, mechanical constraining means movable between a constraining position wherein it constrains the plunger means at a projected position against axial movement so that a swingable movement of the first swingable arm means is transmitted through the plunger means to the second swingable arm means to have the valve means actuated by the cam means and a retracted position wherein the plunger means is made free to move axially against the resilient means so that the second swingable arm means is maintained stationary even when the first swingable arm means is actuated by the cam means to hold the valve means in the closed position.

2. An engine valve mechanism in accordance with claim 1 in which said plunger means is provided on the second swingable arm means so as to make the first swingable arm means small in weight.

3. An engine valve mechanism in accordance with claim 1 in which said mechanical constraining means includes a locking plate movable in a direction transverse to said plunger means between the contraining position and the retracted position, said plunger means having groove means for being engaged with said locking plate in the constraining position.

4. An engine valve mechanism in accordance with claim 3 which further includes actuator means for moving the locking plate between the constraining position and the retracted position.

5. An engine valve mechanism in accordance with claim 3 in which said first and second swingable arm means are mounted on a shaft, said locking plate being connected with a sleeve which is also mounted on the shaft for rotation and axial movement, actuator means being provided for axially driving said sleeve in an axial direction to thereby move the locking plate between the constraining position and the retracted position.

6. An engine valve mechanism including valve means which is resiliently urged into a closed position, valve actuating means for actuating said valve means into an open position, said valve actuating means including cam means adapted to be rotated synchronously with an engine rotation, first swingable arm means mounted on a shaft for a swinging movement and adapted to be engaged with said cam means to be swingably actuated thereby, second swingable arm means mounted on said shaft for swinging movement and adapted to be engaged with said valve means to open the valve means when the second swingable arm means is swung about said shaft, plunger means provided on one of said first and second swingable arm means to extend in a direction perpendicular to said shaft and axially slidably movable on said one arm means, resilient means for urging said plunger means axially to have one end of said plunger means engage with the other swingable arm means, a locking plate movable in a direction transverse to the plunger means between a locking position wherein it engages the plunger means to lock the plunger means against axial movement and a retracted position wherein it is disengaged from the plunger means to allow the axial movement, actuator means for moving said locking plate between the locking position and the retracted position.

7. An engine valve mechanism in accordance with claim 6 in which said locking plate is formed with an aperture including a small diameter part having a diameter smaller than that of the plunger means and a large diameter part having a diameter larger than that of the plunger means, said plunger means having circumferential groove means for engagement with said small diameter part in the locking position of the locking plate, the large diameter part being aligned with said plunger means in the retracted position of the locking plate.

8. An engine valve mechanism in accordance with claim 7 in which said first and second swingable arm means are mounted on a shaft, said locking plate being connected with a sleeve which is also mounted on the shaft for rotation and axial movement, actuator means being provided for axially driving said sleeve in an axial direction to thereby move the locking plate between the constraining position and the retracted position.

* * * * *